United States Patent
Athley et al.

(10) Patent No.: US 8,588,854 B2
(45) Date of Patent: Nov. 19, 2013

(54) ADAPTIVE TRANSMISSION SELECTION

(75) Inventors: Fredrik Athley, Kullavik (SE); Bjorn Gunnar Johannisson, Kungsbacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 361 days.

(21) Appl. No.: 13/140,639

(22) PCT Filed: Dec. 19, 2008

(86) PCT No.: PCT/EP2008/067995
§ 371 (c)(1),
(2), (4) Date: Jun. 17, 2011

(87) PCT Pub. No.: WO2010/069391
PCT Pub. Date: Jun. 24, 2010

(65) Prior Publication Data
US 2011/0256893 A1   Oct. 20, 2011

(51) Int. Cl.
*H04M 1/00* (2006.01)
(52) U.S. Cl.
USPC .............. 455/562.1; 455/575.7; 455/522; 455/115.1; 455/507
(58) Field of Classification Search
USPC ............ 455/500, 446, 422, 562, 522, 69, 70, 455/296, 101, 561, 436, 439, 13.3, 19, 507, 455/562.1, 575.7, 140, 115.1; 370/329, 370/260, 345, 338, 351; 375/267, 260, 299, 375/346, 347, 348, 350; 359/117; 343/753
See application file for complete search history.

(56) References Cited

U.S. PATENT DOCUMENTS

| | | | | |
|---|---|---|---|---|
| 5,956,641 | A | * | 9/1999 | Bruckert et al. ............. 455/442 |
| 6,275,704 | B1 | * | 8/2001 | Dixon ............................ 455/446 |
| 6,434,386 | B1 | * | 8/2002 | Lundborg ...................... 455/436 |

(Continued)

FOREIGN PATENT DOCUMENTS

| | | |
|---|---|---|
| CN | 1360800 A | 7/2002 |
| CN | 1541023 A | 10/2004 |

(Continued)

OTHER PUBLICATIONS

English Translation of Chinese Search Report issued from CN200880132449.6 on May 8, 2013, 2 pages.

*Primary Examiner* — Tan Trinh
(74) *Attorney, Agent, or Firm* — Rothwell, Figg, Ernst & Manbeck, P.C.

(57) ABSTRACT

A controlling station (110, 400) comprising an antenna arrangement (420) with a number of antennas, which each covers one of a number of adjacent cells, with a main beam with a beamwidth that extends into two immediately adjacent cells. The controlling station (110, 400) is adapted to: -transmit on a control channel on a first number of antennas, -measure the output power on the traffic channels on the first number of antennas, -if the traffic channel output power on any of said first number of antenna is above a threshold, transmission on the control channel is activated on a second number of antennas, -measure the traffic channel output power on each antenna in the antenna arrangement, -if the measured traffic channel output power on an antenna is below a second threshold and the traffic channel on the antennas of both adjacent cells is active, the control channel transmissions on that antenna are deactivated.

20 Claims, 4 Drawing Sheets

(56) References Cited

U.S. PATENT DOCUMENTS

| | | |
|---|---|---|
| 6,584,330 B1 | 6/2003 | Ruuska |
| 6,597,922 B1 * | 7/2003 | Ling et al. .................... 455/522 |
| 8,023,951 B2 | 9/2011 | Mattila |
| 8,155,233 B1 * | 4/2012 | Lee et al. ....................... 375/267 |
| 8,274,937 B2 * | 9/2012 | Tsai ............................... 370/329 |
| 2008/0287163 A1 | 11/2008 | Skarby et al. |
| 2010/0054200 A1 * | 3/2010 | Tsai ............................... 370/329 |
| 2012/0127985 A1 * | 5/2012 | Sampath ....................... 370/345 |

FOREIGN PATENT DOCUMENTS

| | | |
|---|---|---|
| EP | 1799000 A2 | 6/2007 |
| GB | 2446438 A | 8/2008 |
| WO | 01/05179 A1 | 1/2001 |

* cited by examiner

ADAPTIVE TRANSMISSION SELECTION

CROSS REFERENCE TO RELATED APPLICATION(S)

This application is a 35 U.S.C. §371 National Phase Entry Application from PCT/EP2008/067995, filed Dec. 19, 2008, and designating the United States, the disclosure of which is incorporated herein in its entirety by reference.

TECHNICAL FIELD

The present invention discloses a device and a method for adaptive selection of transmission in a number of cells in a cellular system.

BACKGROUND

In a cell of a cellular telecommunications system, irrespective of the particular kind of system, e.g. GSM, WCDMA, TD-SCDMA, LTE etc, there is usually a controlling station for the cell, i.e. a station which has as one of its functions to control the traffic to and from the users in the cell. A controlling station is usually equipped with an antenna arrangement which comprises a number of antennas, each of which covers one or more cells.

In each cell, regardless of the presence or absence of users in the cell, the controlling station transmits on one or more so called control channel, in order to provide control information to users in the cell. Payload traffic to the users in the cell is transmitted on so called traffic channels. This principle, i.e. control channels and traffic channels, is used in most types of cellular systems, regardless of the type of system, although the actual names of the channels may differ between e.g. GSM, WCDMA, TD-SCDMA, LTE etc.

Since transmissions on the control channel are made in a cell regardless of the presence of users in the cell, these transmissions may sometimes be a waste of energy, if there are no users in the cell. Since conservation of energy is a major concern for operators of cellular systems, this can be a problem.

SUMMARY

As stated above, there is a need for a solution by means of which energy consumption can be kept down in a cellular system in which there is a controlling station which transmits in cells by means of a plurality of antennas which "handle" different cells.

Such a solution is provided by the present invention in that it discloses a controlling station for one or more cells in a cellular telecommunications system which comprises a transmitter and an antenna arrangement with a first number of antennas.

Each of the antennas of the antenna arrangement is adapted to cover one of a number of adjacent cells, and each antenna has a a beamwidth such that the main beam extends by a certain amount into two cells which are immediately adjacent on each side of the cell which the antenna is adapted to cover.

The controlling station of the invention is adapted to:
transmit on a control channel on a first number of antennas which cover non-adjacent cells,
measure the output power which is transmitted on the traffic channels on each of the first number of antennas,
if the measured total traffic channel output power on any of the first number of antennas is above a first predefined threshold, transmission on the control channel is activated on a second number of antennas,
measure the traffic channel output power on each of the antennas in the antenna arrangement,
if the measured traffic channel output power on an antenna is below a second predefined threshold and the traffic channel on the antennas of both adjacent cells is active, the control channel transmissions on that antenna are deactivated.

Since each antenna has a a beamwidth such that the main beam extends by a certain amount into the cells which are immediately adjacent to the cell which the antenna is adapted to cover, an acceptable degree of coverage can be obtained even in cells in which the control channel transmissions are deactivated, whilst reducing the energy consumption since no control channel transmissions are made.

In one embodiment of the invention, in order to obtain the acceptable degree of coverage, the half-power beamwidth of the main beam of each antenna is in the range of 40-70 degrees.

In one embodiment of the invention, in order to obtain the acceptable degree of coverage, the half-power beamwidth of the main beam of each antenna is in the range of 45-55 degrees.

In one embodiment of the invention, in order to obtain the acceptable degree of coverage, the half-power beamwidth of the main beam of each antenna is 50 degrees.

In one embodiment of the invention, the first number of antennas is half the total number of antennas in the antenna arrangement.

In one embodiment of the invention, the second number of antennas is half the total number of antennas in the antenna arrangement.

The invention also discloses a corresponding method for use in a controlling station for one or more cells.

BRIEF DESCRIPTION OF THE DRAWINGS

The invention will be described in more detail in the following, with reference to the appended drawings, in which.

DETAILED DESCRIPTION

The invention will be described in the following by means of terminology used in GSM and/or UMTS systems. However, it should be made clear that this is by way of example only, and merely in order to facilitate the understanding of the invention. The terminology used in the following should thus not be seen as restricting the scope of protection sought for nor granted to the present invention, which may be applied to a wide range of other cellular systems, such as for example WCDMA, TD-SCDMA and LTE.

Figure 1:
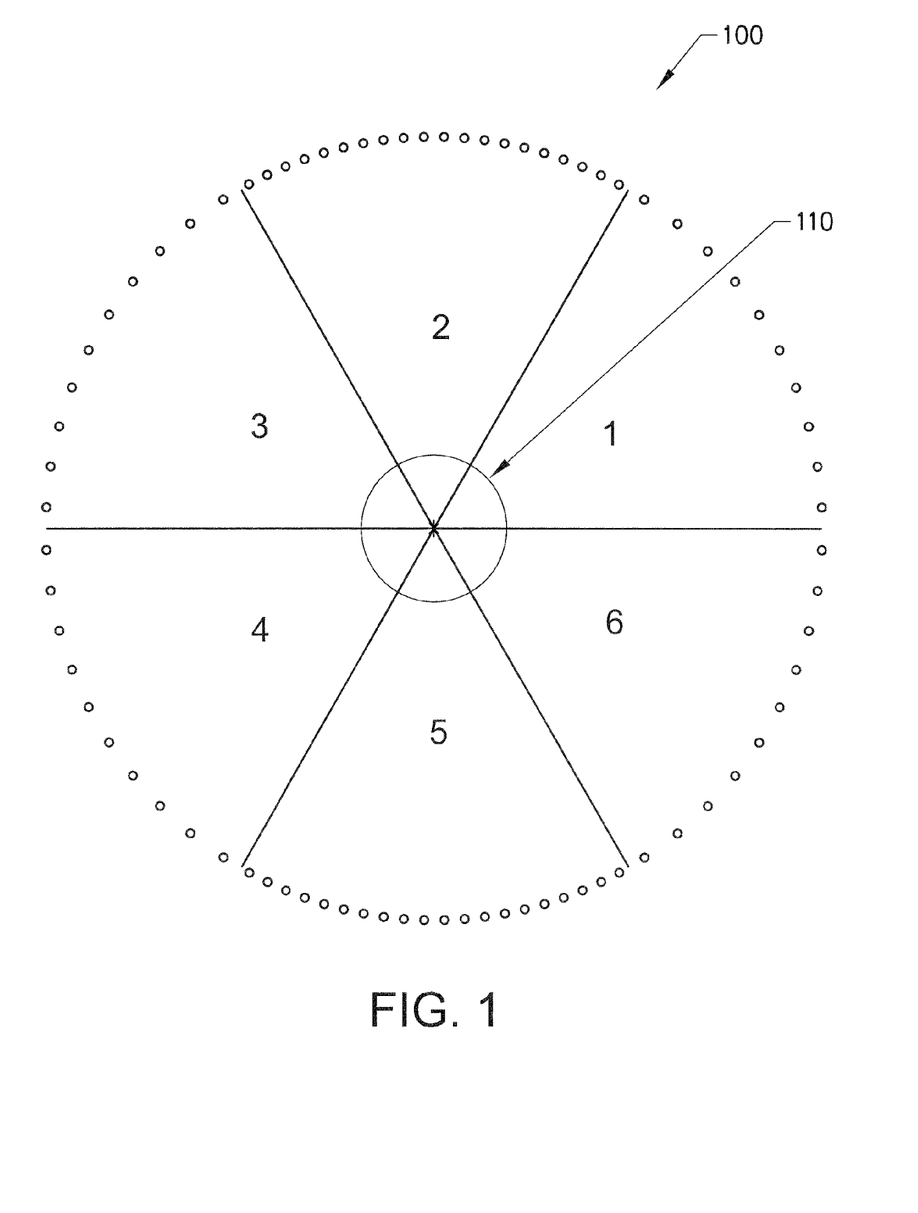
FIG. 1 shows a schematic top view of a system in which the present invention can be applied.

FIG. 1 shows a schematic top view of a system 100 in which the present invention can be applied. The system 100 comprises a controlling station 110, which has as one of its functions to control the traffic to and from the users in cells in the system 100.

As indicated in FIG. 1, the system 100 is divided into six cells, numbered 1-6, which, when seen in a "top view", can be seen as equally large "pie slices". Naturally, the number of cells and their individual sizes can be varied within the scope of the invention; the number of cells and their sizes and shape as shown in FIG. 1 is merely an example.

Also indicated in FIG. 1 are a number of users, indicated by means of dots on the perimeter of the system 100. Ten users are indicated in each of cells 1, 3, 4 and 6, and in cells 2 and 5 there are twenty users each. The number of users and their distribution between the different cells is also of course only an example.

The controlling station 110 of the invention comprises a number of components, among them an antenna arrangement which in turn comprises a number of antennas, each of which is used for one of the cells 1-6. Naturally, one antenna can be used for more than one cell, whilst still employing the principle disclosed by the present invention, or more than one antenna can be used per cell, while adhering to the principles disclosed by the present invention.

However, in one embodiment, one antenna is used for each of the cells 1-6, and according to the invention, each of these antennas has a beamwidth such that the main beam extends by a certain amount into two cells which are immediately adjacent on each side of the cell which the antenna is adapted to cover. Thus, for example, the antenna which is used for cell 1 will have a certain degree of coverage in cells 2 and 6, a principle which is applied to each of the antennas of the controlling station. Naturally, this principle, and the invention as such, can be applied to a sub-set of the antennas, so that only the antennas for cells 1-3, for example, have a degree of coverage into each other's cells, and the principles of the invention are applied only to those cells.

Figure 2:
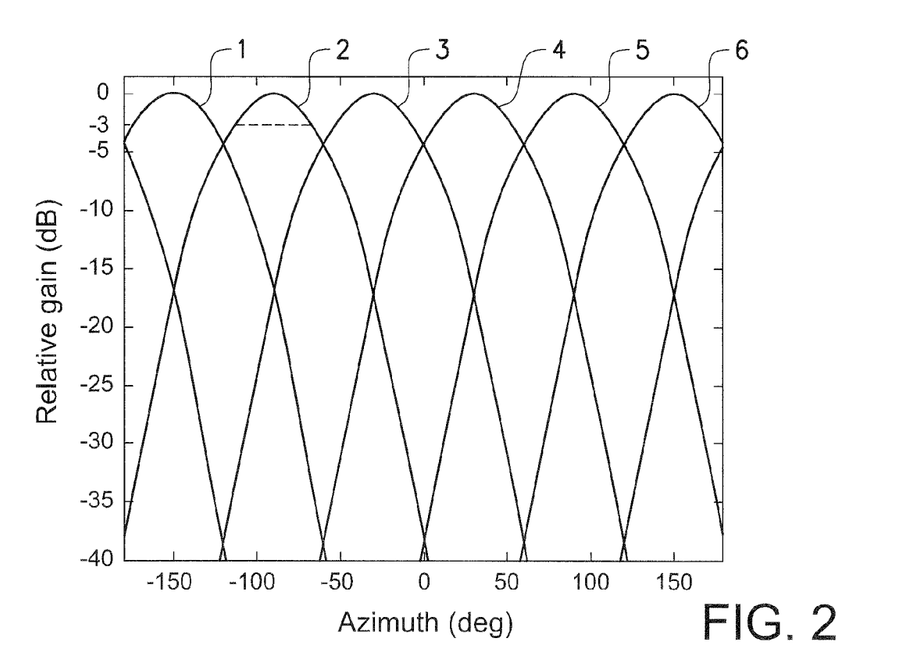
FIGS. 2 and 3 show radiation patterns of an antenna arrangement of the invention.

A diagram which shows the radiation patterns and beamwidths of the main beam of six adjacent antennas 1-6 of the invention is shown in FIG. 2: as seen here, the main beam of each antenna has an overlap in coverage with the two antennas on each side of it. Each antenna with a certain number 1-6 can be seen as belonging to the cell with the corresponding number 1-6, although the angles indicated for the individual antennas of FIG. 2 do not correspond to those of the cells of FIG. 1.

In most cellular systems, the controlling station 110 transmits in each cell 1-6 on a control channel, here given the generic name CCH, in order to transmit control information to users in the cell 100, including users who are "new" to the cell, e.g. due to hand over from other cells, or users who have come out of an "idle" state etc.

A purpose of the invention is to save energy by a more efficient use of the CCH transmissions. In short, this purpose is obtained by means of adaptively identifying and selecting antennas of the controlling station that should be "active", i.e. antennas from which there should be CCH transmissions, as well as identifying and selecting antennas that should be "inactive", i.e. not used for CCH transmissions.

The number of active antennas is, by means of the invention, adapted according to the current traffic situation in the cells 1-6. Antennas that are not active will thus not transmit any CCH signals, by means of which the controlling station will save energy, and will also cause less interference in adjacent cells.

Figure 3:
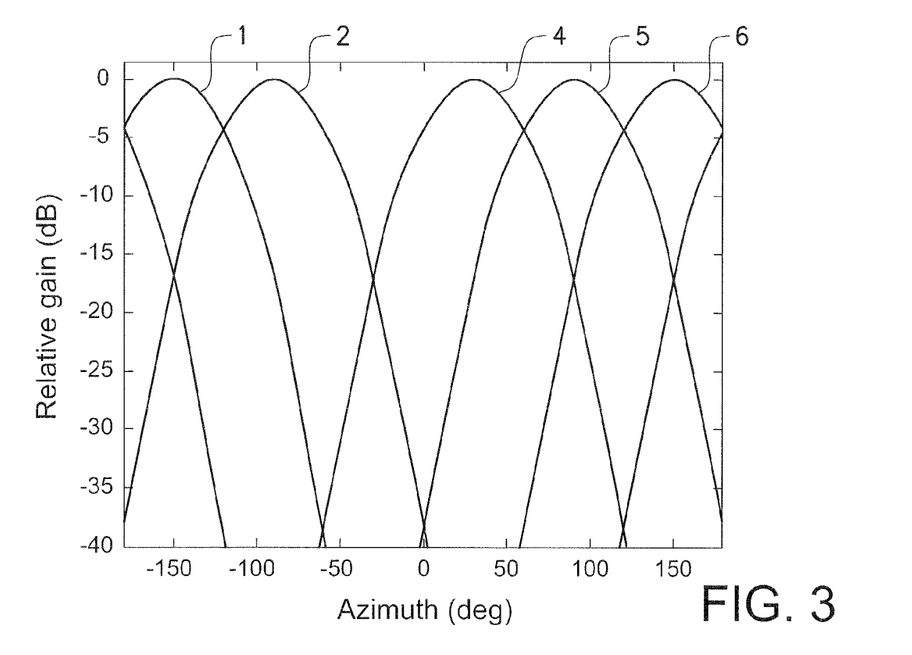

As shown in FIG. 2, and as also mentioned above, even if an antenna, for example antenna number 3, is deactivated, i.e. no CCH transmissions are made from that antenna, cell 3 will still not be entirely inactive, due to the fact that the antennas of the immediately adjacent cells, i.e. antennas 2 and 4 cover cell 3 to a certain extent. This is illustrated in FIG. 3, in which antenna number 3 has been removed, to indicate what happens when an antenna is "inactive": antennas 2 and 4 extend into cell 3, so that the lowest relative antenna gain obtained in cell 3 when antenna 3 is "inactive" is −17.5 dB. Naturally, the beamwidths of the the main beam of the individual antennas 1-6 can be varied so that an appropriate gain is obtained in a cell whose antenna is "inactive", i.e. does not transmit CCH.

Figure 4:
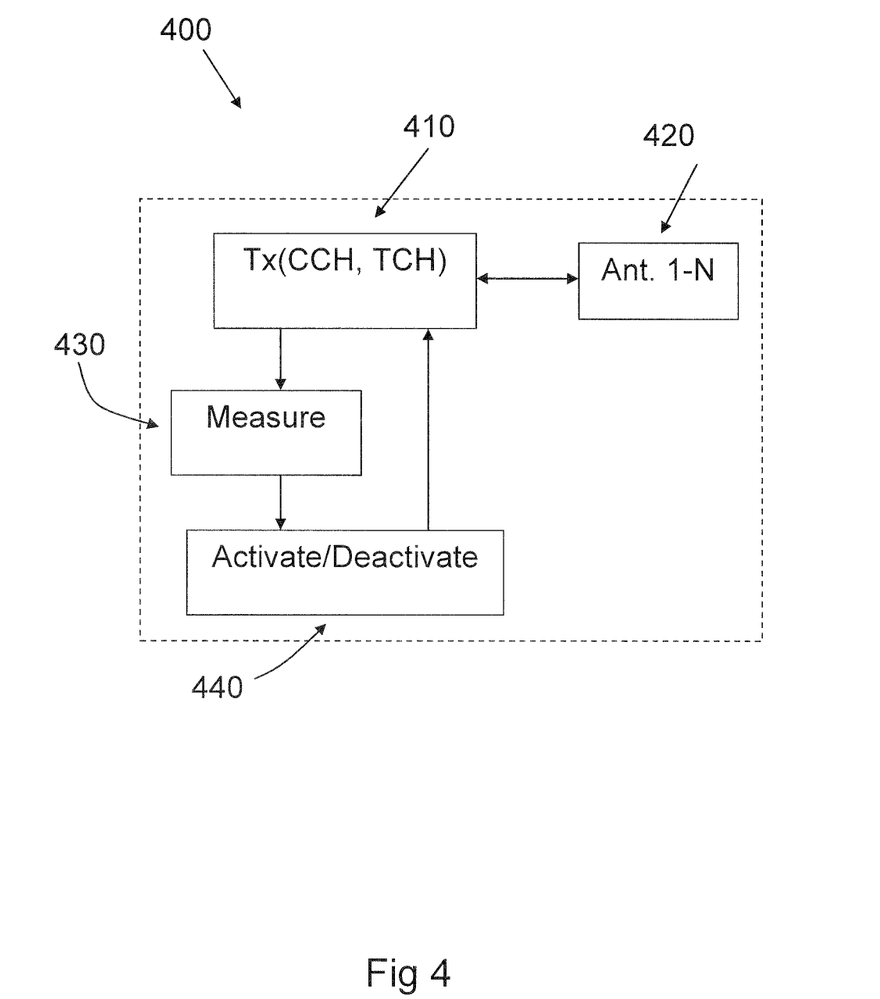
FIG. 4 shows a block diagram of one embodiment a controlling station of the invention

Before an example is given of an embodiment of the invention, some major components of a controlling station 400 of the invention will be described with reference to FIG. 4. As seen in FIG. 4, the controlling station 400 comprises an antenna arrangement 420 with a first number, N, of antennas, for example six antennas as shown in FIGS. 1-3.

The controlling station 400 also comprises a transmitter 410 for transmitting CCH in the antennas 1-N, as well as for transmitting one or more traffic channels, here referred to generically as "TCH", in the antennas 1-N. Naturally, the transmitter 410 can comprise a plurality of "individual" transmitters, so that there is one transmitter for each antenna.

In addition, the controlling station 400 comprises a function 430 for measuring the output power of the TCH from each of the antennas 1-N, as well as a function 440 for "activating" and "deactivating" the CCH transmission from each of the antennas 1-N. The measuring function 430 and the activating/deactivating function 440 are suitably designed as software and/or hardware functions in the transmitter 410.

Figure 5:
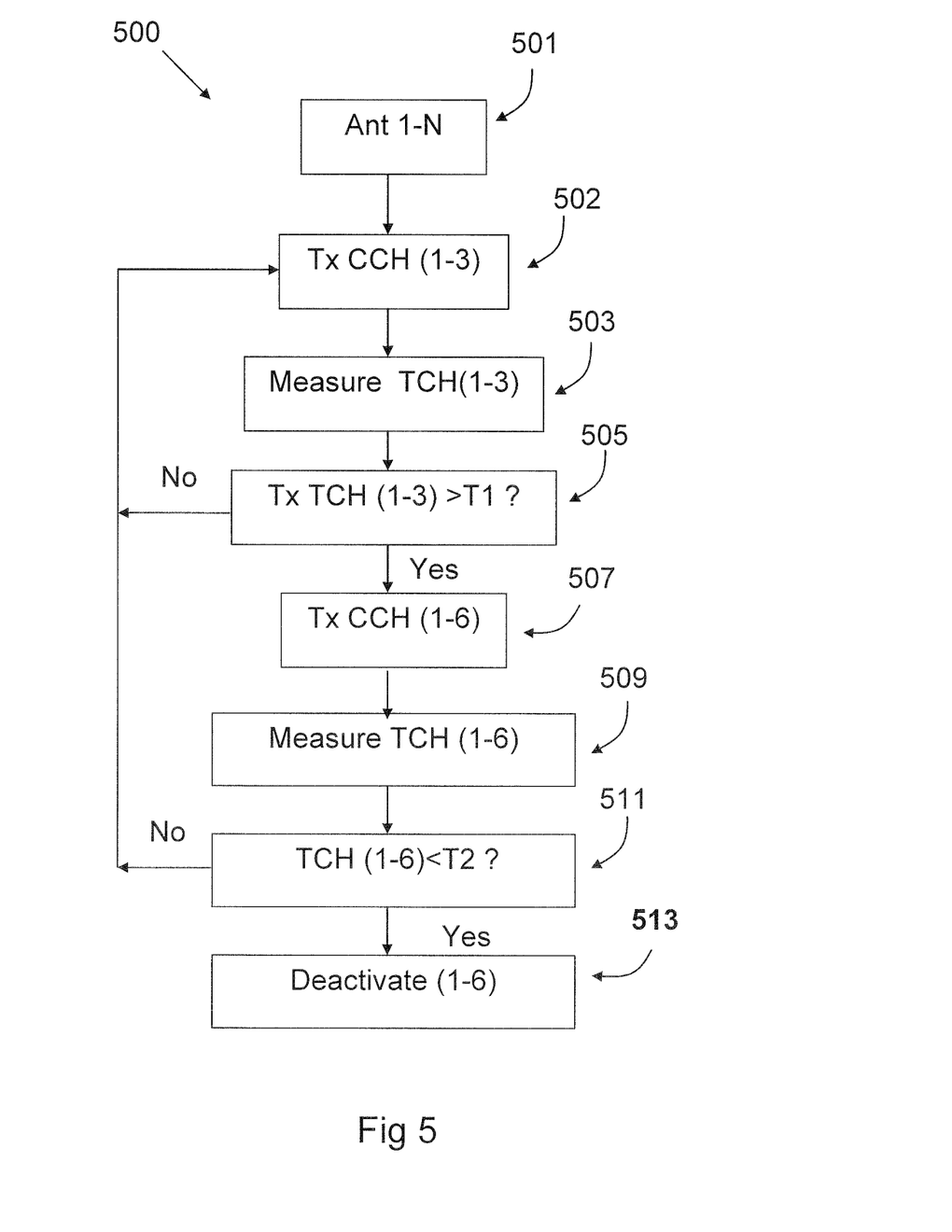
FIG. 5 shows a flow chart of a method of the invention.

Turning now to how the components shown in FIG. 4 are used in the present invention, this is illustrated in FIG. 5, which shows a flow chart of steps of a method 500 of the invention, in which the components of FIG. 4 are employed.

As has also emerged from the description above, the inventive method 500 is intended for use in a controlling station of a cell in a cellular telecommunications system.

The method 500 comprises, as shown in step 501, equipping the controlling station with an antenna arrangement with a first number, "N", of antennas, each of which is adapted to cover one of a number of adjacent cells.

Each antenna in the antenna arrangement has a beamwidth such that the main beam extends by a certain amount into two cells which are immediately adjacent on each side of the cell which the antenna is adapted to cover.

The method 500 comprises the following steps, as also shown in FIG. 5:

transmitting, step 502, on a control channel on a first number of antennas which cover non-adjacent cells, the numbers 1-3 being used here to exemplify such cells, measuring, step 503, the output power which is transmitted on the traffic channels on each of said first number of antennas, checking, step 505, if the measured total traffic channel output power on any of said first number of antenna is above a first predefined threshold, T1, and if that is the case, activating transmission, step 507, on the control channel on a second number of antennas, which in this example is all of the antennas 1-6, measuring, step 509, the traffic channel output power on each of the second number of antennas, deactivating, step 513, the control channel transmissions on an antenna of a cell if, step 511, the measured traffic channel output power on that antenna is below a second predefined threshold and the traffic channel on the antennas of both adjacent cells is active.

The first number of antennas mentioned above is in one embodiment half the total number of antennas in the antenna arrangement, as shown above, i.e. 3 antennas out of 6, and the second number of antennas is also half the total number of antennas in the antenna arrangement. These are also the numbers which have been used above and in the flow chart in FIG. 5, but it should be pointed out that this is by way of example only; both the first and the second number of antennas can within the scope of the invention be varied within the total number of antennas available in the system.

In order to obtain the desired effect of a degree of coverage by means of antennas in cells which are immediately adjacent to a cell in which the CCH transmission have been deactivated, antennas with main beams of various half-power beam-widths can be used. In one embodiment, the half-power beamwidth, $\alpha$, of the main beam of the antennas of the antenna arrangement with which the controlling station is equipped is in the range of 40-70 degrees, whilst in another embodiment it is in the range of 45-55 degrees.

In one embodiment, the half-power beamwidth, $\alpha$, of the main beam of the antennas of the antenna arrangement with which the controlling station is equipped is 50 degrees.

The invention can be employed in adjacent cells which combine to cover more or less any angle in the range of 0-360 degrees, but in one embodiment, the antennas of the antenna arrangement have a total coverage of 360 degrees, and in one embodiment, each antenna is arranged to cover a cell of 60 degrees width.

Two predefined thresholds have been mentioned above for the TCH. Suitably, the second predefined threshold is larger than the first predefined threshold.

In one embodiment, when the control channel transmissions on an antenna are deactivated, the deactivation is done gradually, for example according to a predefined curve in order to enable the system to adapt, for example in order for handover of users to take place between the cells.

The invention is not limited to the examples of embodiments described above and shown in the drawings, but may be freely varied within the scope of the appended claims.

The invention claimed is:

1. A controlling station for one or more cells in a cellular telecommunications system, comprising a transmitter and an antenna arrangement with a first number of antennas, each of which is adapted to cover one of a number of adjacent cells, in which each antenna has a beamwidth such that the main beam extends by a certain amount into two cells which are immediately adjacent on each side of the cell which the antenna is adapted to cover, the controlling station configured to:
   transmit on a control channel on a first number of antennas which cover non-adjacent cells;
   measure the output power which is transmitted on the traffic channels on each of said first number of antennas;
   if the measured total traffic channel output power on any of said first number of antenna is above a first predefined threshold, transmission on the control channel is activated on a second number of antennas;
   measure the traffic channel output power on each of the antennas in the antenna arrangement; and
   if the measured traffic channel output power on an antenna is below a second predefined threshold and the traffic channel on the antennas of both adjacent cells is active, the control channel transmissions on that antenna are deactivated.

2. The controlling station of claim 1, wherein the half-power beamwidth ($\alpha$) of the main beam of each antenna is in the range of 40-70 degrees.

3. The controlling station of claim 1, wherein the half-power beamwidth ($\alpha$) of the main beam of each antenna is in the range of 45-55 degrees.

4. The controlling station of claim 1, wherein the half-power beamwidth ($\alpha$) of the main beam of each antenna is 50 degrees.

5. The controlling station of claim 1, wherein the total coverage afforded by the antennas in the antenna arrangement is 360 degrees.

6. The controlling station of claim 5, wherein the antenna covers a cell of 60 degrees width.

7. The controlling station of claim 1, wherein the first number of antennas is half the total number of antennas in the antenna arrangement.

8. The controlling station of claim 1, wherein the second number of antennas is half the total number of antennas in the antenna arrangement.

9. The controlling station of claim 1, wherein the second predefined threshold is larger than the first predefined threshold.

10. The controlling station (110, 400) of claim 1, wherein, when the control channel transmissions on an antenna are deactivated, the deactivation is done gradually, according to a predefined curve.

11. A method for use in a controlling station of one or more cells in a cellular telecommunications system, the method comprising equipping the controlling station with an antenna arrangement with a first number of antennas, each of which is adapted to cover one of a number of adjacent cells, with each antenna having a beamwidth such that the main beam extends by a certain amount into two cells which are immediately adjacent on each side of the cell which the antenna is adapted to cover;
   transmitting on a control channel on a first number of antennas which cover non-adjacent cells;
   measuring the output power which is transmitted on the traffic channels on each of said first number of antennas;
   checking if the measured total traffic channel output power on any of said first number of antenna is above a first predefined threshold (T1), and if that is the case, activating transmission on the control channel on a second number of antennas;
   measuring the traffic channel output power on each of the antennas in the antenna arrangement; and
   deactivating the control channel transmissions on an antenna of a cell if the measured traffic channel output power on that antenna is below a second predefined threshold and the traffic channel on the antennas of both adjacent cells is active.

12. The method of claim 11, wherein the half-power beamwidth ($\alpha$) of the main beam of the antennas of the antenna arrangement with which the controlling station is equipped is in the range of 40-70 degrees.

13. The method of claim 11, wherein the half-power beamwidth ($\alpha$) of the main beam of the antennas of the antenna arrangement with which the controlling station is equipped is in the range of 45-55 degrees.

14. The method of claim 11, wherein the half-power beamwidth ($\alpha$) of the main beam of the antennas of the antenna arrangement with which the controlling station is equipped is 50 degrees.

15. The method of claim 11, wherein the antennas of the antenna arrangement have a total coverage of 360 degrees.

16. The method of claim 15, wherein each antenna is arranged to cover a cell of 60 degrees width.

17. The method of claim 11, wherein the first number of antennas is half the total number of antennas in the antenna arrangement.

18. The method of claim 11, wherein the second number of antennas is half the total number of antennas in the antenna arrangement.

19. The method claim 11, wherein the second predefined threshold is larger than the first predefined threshold.

20. The method of claim 11, wherein, when the control channel transmissions on an antenna are deactivated, the deactivation is done gradually, according to a predefined curve.

* * * * *

UNITED STATES PATENT AND TRADEMARK OFFICE
CERTIFICATE OF CORRECTION

| | |
|---|---|
| PATENT NO. | : 8,588,854 B2 |
| APPLICATION NO. | : 13/140639 |
| DATED | : November 19, 2013 |
| INVENTOR(S) | : Athley et al. |

It is certified that error appears in the above-identified patent and that said Letters Patent is hereby corrected as shown below:

In the Specification

In Column 2, Line 42, delete "applied, and" and insert -- applied, --, therefor.

In Column 2, Line 44, delete "invention, and" and insert -- invention, --, therefor.

In Column 2, Line 46, delete "invention" and insert -- invention, and --, therefor.

In the Claims

In Column 6, Line 12, in Claim 10, delete "station (110,400)" and insert -- station --, therefor.

In Column 6, Line 66, in Claim 19, delete "method claim" and insert -- method of claim --, therefor.

Signed and Sealed this
Twenty-second Day of July, 2014

Michelle K. Lee
*Deputy Director of the United States Patent and Trademark Office*